Sept. 29, 1970     C. E. MENEAR     3,531,272
INTERNAL FLAME TREATMENT OF CRYSTALLIZABLE GLASS
Original Filed July 1, 1965     2 Sheets-Sheet 1
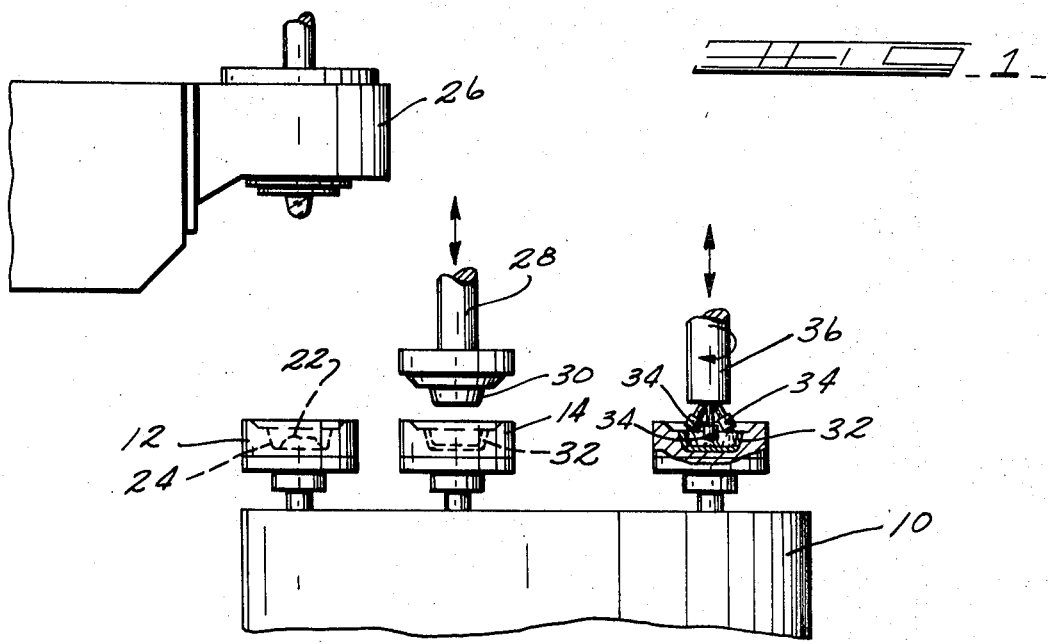
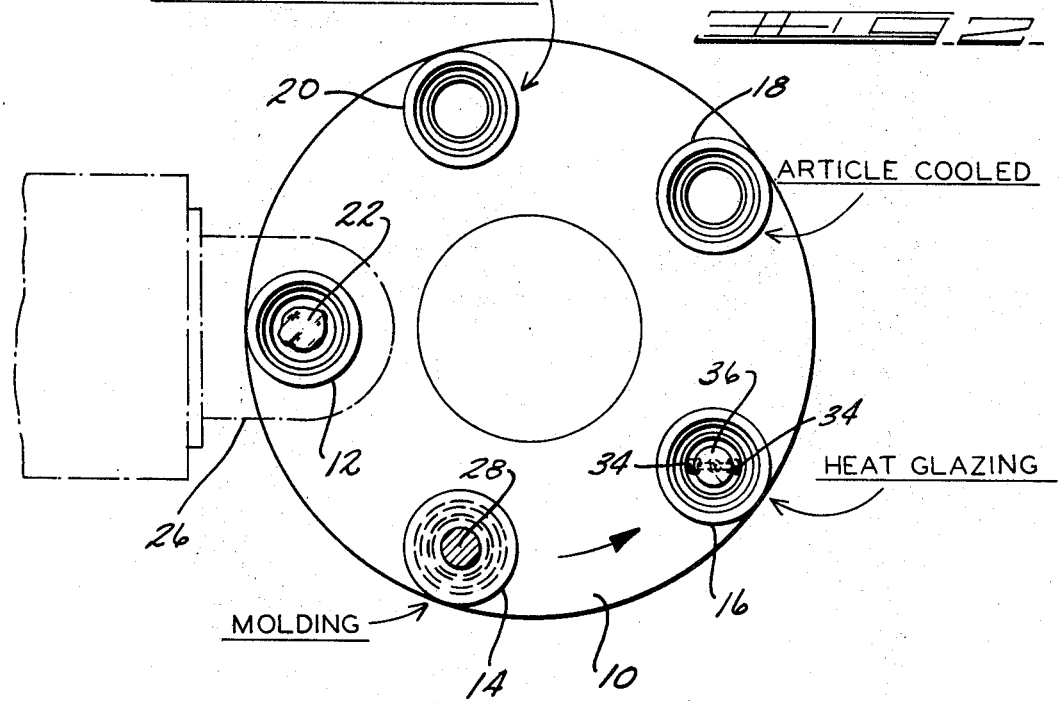
INVENTOR.
CHARLES E. MENEAR
BY W. A. SCHAICH &
CLARON N. WHITE
ATTORNEYS

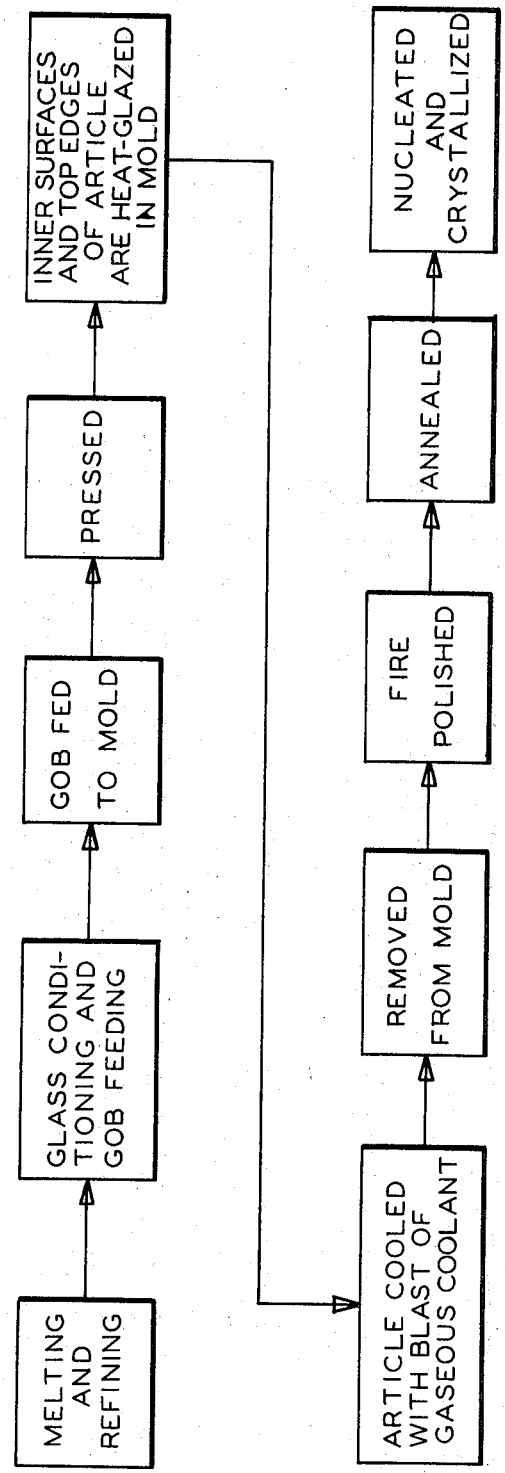

3,531,272
INTERNAL FLAME TREATMENT OF CRYSTALLIZABLE GLASS
Charles E. Menear, Muncie, Ind., assignor to Owens-Illinois, Inc., a corporation of Ohio
Continuation of application Ser. No. 468,851, July 1, 1965. This application Oct. 18, 1968, Ser. No. 781,678
Int. Cl. C03b 29/00, 21/00
U.S. Cl. 65—33                                    6 Claims

ABSTRACT OF THE DISCLOSURE

Production of haze-free, glass-ceramic articles by heat glazing the inner surfaces of the hot, shaped, crystallizable glass article by applying external heat to the inner surfaces while the article is in the forming mold, the heat glazing being sufficient to initiate uniform softening of the crystallizable glass but insufficient to cause premature crystallization thereof. The heat glazing step, which is preferably accomplished by using a directly applied flame with a temperature of about 2500° F. to 3300° F. for about 0.2 to 3 seconds, provides haze-free final products whereas the elimination of the heat glazing step provides products with undesirable haze.

---

This application is a continuation of Ser. No. 468,851 filed July 1, 1965, now abandoned.

This invention relates broadly to the art of producing shaped glass-ceramic articles and, more particularly, to certain new and useful improvements in a method of making such articles. These glass-ceramic materials are also sometimes designated as "crystalline" (i.e., at least partly crystalline or semi-crystalline) ceramic materials.

In recent years the use of ceramics including shaped ceramic bodies or articles that are made by the controlled crystallization of glass bodies has come into extensive use for certain purposes, particularly where overall strength and resistance to heat are required, e.g., as "cookware" or, under the broader term, "pressed ware." Such articles, compositions used in their manufacture, and method features are known (see, for example, U.S. Pats. 2,960,801 and -802 dated Nov. 22, 1960; also, an article entitled "Glass," Chemical and Engineering News, Nov. 16, 1964, pp. 80–96, especially pp. 89, 90 and 96, for additional information on glass-ceramics, their properties and uses). Reference is also made to the compositions and bodies or articles comprised of crystalline ceramics (glass-ceramics) that are produced as described in Smith copending application Ser. No. 352,958, filed Mar. 18, 1964, now U.S. Pat. No. 3,380,818, and in Babcock et al. copending application Ser. No. 386,693, filed July 31, 1964, now abandoned and refiled as continuation in part application Ser. No. 464,147 on June 15, 1965, now abandoned, both of which applications are assigned to the same assignee as the present invention. By this cross-reference the disclosures of the patent and the copending applications are made a part of the disclosure of the instant application.

A typical general procedure in making shaped glass-ceramic bodies is outlined below:

(1) Melting and refining
(2) Glass conditioning and gob feeding
(3) Gob fed to mold
(4) Pressed
(5) Article cooled with blast of gaseous coolant
(6) Removed from mold
(7) Fire polished
(8) Annealed
(9) Nucleated and crystallized In many cases when the above general procedure for making pressed or shaped glass-ceramic articles is followed, and particularly when using certain "crystallizable" (including potentially crystallizable) glass compositions, a haze develops on and/or within the inside surface (including inside bottom and sidewall surfaces) of the structure, e.g., cookware, during and/or after the fire-polishing step. The step of fire polishing is employed to heal minor match-line defects and to polish or smooth out the overall surfaces. In other words, fire polishing serves, for example, to smooth the sharp edges created by the plunger-ring match line and the ring-mold match line. Fire polishing is accomplished by the use of a device such as, for example, a Knight glazer. Of course, if match-line defects are unimportant as when the glass-ceramic structure is to be used in industrial applications, then the fire-polishing step may be omitted.

The instant invention is based, in part, on my discovery that the aforementioned haze in the shaped article, and the cause of which is not definitely known, can be eliminated by the application of sufficient heat. However, after the article has been removed from the mold it is necessary to apply more heat to effect this haze-removal than is required in a normal fire-polishing step. I have found that the heat necessary to eliminate the haze must be at least sufficient to initiate softening of the crystallizable glass; but if this amount of heat be applied during fire polishing after the article has been removed from the mold, excessive and objectionable distortion of the pressed ware occurs, and in some cases localized premature crystallization is encountered. Such premature crystallization detracts from the surface appearance of the finished article and can cause a wrinkling effect that detracts both from its appearance and stability and clarity.

The present invention is based, additionally, on a solution to the foregoing problem whereby the aforementioned difficulties are obviated. More particularly I have found that the above-described general procedure for making a shaped glass-ceramic structure such as a vessel, receptacle, container or the like advantageously can be modified by introducing another step in the process after the gob of crystallizable glass has been pressed in a mold but before the pressed ware has been removed from the mold. This step is herein designated as a heat-glazing step and thus is distinguished from a conventional fire-polishing step that is applied to pressed ware after removal from the mold.

Regardless of whether or not haze-forming ingredients are present in the crystallizable glass composition, the aforementioned heat-glazing step serves to smooth out irregularities that cause roughness of the inner surfaces and top edge of the shaped structure and provides a smoother finish to the said surfaces and edge of the final glass-ceramic article than is possible in the absence of this heat-glazing step. The aforementioned irregularities may be due to, for example, plunger motion (inside impact mark), plunger temperature and, particularly, plunger damage.

The novel features that are characteristic of my invention are set forth in the appended claims. The invention itself, however, will best be understood as the description of the invention proceeds with reference to the accompanying drawing in which:

FIG. 1 illustrates schematically in side elevation certain steps in the process involved in this invention including the aforementioned heat-glazing step;

FIG. 2 is a schematic plan view shown more clearly the relationship of the aforesaid heat-glazing step to other steps before and after it in the process; and FIG. 3 is a flow sheet of main features of the overall process.

Referring now to FIGS. 1 and 2, a turntable 10 is shown as being provided with stations or positions 12, 14, 16, 18 and 20 (FIG. 2) of which stations 12, 14 and 16 are shown in FIG. 1. At station 12 a gob of hot crystallizable glass 22 is fed to the female member or mold 21 from the gob feeder 26. At station 14 the rod or arm 28 having at its lower end the plunger 30 shapes, on its downward stroke, the hot glass gob 22 into the form of a molded structure 32. At station 16 the heat-glazing treatment is applied to the shaped article or structure 32.

The action that takes place at station 16 consists in heat-glazing at least the inner surface(s) (bottom and sidewall inner surface when the shaped structure or article is a vessel or the like), and preferably also the top edge, of the hot, shaped article (i.e., molded structure 32) by means of externally applied heat while the article is still in the shaping device (e.g., a mold) in which it was initially shaped. The invention is particularly applicable, and provides an improvement, in a method wherein a crystallizable glass composition initially contains matter which, in the absence of the improvement of this invention, causes haziness of the shaped glass-ceramic article but with the said improvement the said haziness is eliminated.

The improvement to which reference is made in the preceding paragraph is obtained in producing shaped glass-ceramic articles having at least inner surfaces by a method which includes the steps of shaping a crystallizable glass composition in a shaping device to form a shaped article having at least inner surfaces, annealing the said article after removal from the said shaping device, and effecting nucleation and crystallization of the annealed article.

Any suitable means may be used to provide the extenally applied heat employed in the heat-glazing step. For example, such applied heat may take the form of a flame treatment. The source of the flame may be one or more burners such as those indicated in FIG. 1 by the numeral 34, and which are attached to the lower end of a leg 36 attached to suitable mechanism (not shown) whereby the said leg can be controllably raised and lowered; and, also, controllably rotated about its vertical axis.

At station 18 (FIG. 2) the shaped article is cooled in the mold, e.g., by the application of a blast of cooling air whereby the molded article is cooled sufficiently so that it can be removed from the mold at station 20.

From the foregoing description it is believed to be clear that the heat-glazing treatment, specifically flame treatment, applied to the pressed ware at station 16 occurs just as soon as possible after the pressed ware or molded structure 32 has been formed and the rod 28 has been raised thereby removing the plunger 30 from the female member 24. This is accomplished by indexing the turntable 10 to the station 16 where the inner surfaces of the pressed ware, and preferably also the top edge, are subjected as soon as possible to the application of heat, e.g., from a combustion flame, for a brief period of time (e.g., from about 0.2 second to about 3 seconds) while the ware is still in the mold. In other words, very shortly after pressing a gob of crystallizable glass previously placed in a female mold to the shape of said mold, at least the inside surface of the pressed article is subjected while still in the mold to a flame treatment for a brief period of time. In a preferred embodiment of the invention, the applied flame is moved about an axis passing only through the center of the base of the pressed ware, and whereby the flame is directed against all (substantially all) inner surfaces of the pressed ware.

It will be understood, of course, by those skilled in the art that this invention is not limited to the use of only five stations as shown in its simplest form in the accomplanying drawing, which is schematic only, and that any desired number of stations may be employed, for instance any odd number (e.g., 7 to 15 or more) when two stations are being indexed or any even number (e.g., 6 to 16 or more) when consecutive stations are being indexed. Also, the turntable may be of sufficient size to accommodate dual stations; that is, pairs (e.g., from 6 to 12 pairs) of stations wherein the same step is carried out at each member of the pair.

In the preferred technique the heat-glazing step takes place at the next available station following the pressing or forming of the article. The term "station" herein, in its singular form, is not intended to mean that the heat-glazing "station" is a single station, since the step of heat-glazing could be carried out in two or more stages, more particularly three or more stages, and the operation then may be designated as having been carried out at a single "station." However, when more than one stage is used in heat glazing, then more heat input and/or time is required to accomplish the desired effect. In some cases (for example when the speed of rotation of the turntable is such that there is insufficient time available to carry out the heat-glazing step in a single stage), then it may be necessary for practical reasons to effect heat-glazing in a plurality of stages.

THE CRYSTALLIZABLE GLASS COMPOSITIONS

The crystallizable glass compositions which are shaped and further processed in practicing this invention may include any of those adapted to yield shaped glass-ceramic bodies or structures. As indicated hereinbefore, the invention is particularly applicable to the processing of those crystallizable glass compositions that initially contain haze-forming (including potentially haze-forming) ingredients or matter; that is, ingredients or matter which, in the absence of the improvement of the invention, causes haziness in the shaped glass-ceramic article.

The invention is applicable in processing crystallizable glass compositions of the kind broadly and specifically set forth in the aforementioned copending applications, Ser. No. 352,958—Smith, now U.S. Pat. No. 3,380,818 application Ser. No. 386,693—Babcock et al. Thus, the process of the invention is applicable to a crystallizable glass composition having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1<–1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent of $Li_2O+MgO$ is up to 10.5, more particularly from 6.3 to 10.5.

A more preferred glass composition (i.e., thermally crystallizable glass) within the broader ranges set forth above is one consisting essentially of the following components, which are present in the following weight percentage ranges,

| | |
|---|---|
| $SiO_2$ | 68–72 |
| $Al_2O_3$ | 16–18 |
| $Li_2O$ | 2.8–3.8 |
| $MgO$ | 3–5 |
| $ZrO_2$ | 1.2–1.5 |
| $TiO_2$ | 1.2–<1.9 |
| $SnO_2$ | 0–1.5 |
| $P_2O_5$ | 0–2 |
| $BaO$ | 0–3 |

Such a glass composition also may contain, if desired 1.9–<2.4 weight percent of $TiO_2$.

In such formulations as set forth above the invention is particularly applicable to those wherein the $P_2O_5$ content of the crystallizable glass composition is a small amount not exceeding 3 weight percent of $P_2O_5$, more particularly from about 0.5 weight percent to 3, and still more particularly from about 1.5 to about 2.25 weight percent of $P_2O_5$.

From formulations such as those given above by way of example, and these and other formulations appearing in the aforementioned copending applications of Smith and of Babcock et al., there can be produced shaped glass-ceramic structures; and, more particularly, shaped, non-porous, at least partly crystalline ceramic receptacles or containers having a multitude of substantially homogeneously dispersed crystals, essentially all of which crystals are in their largest lineal dimension less than 25 microns across. Such glass-ceramic articles, which are formed from a preformed glass article by thermal in situ crystallization, have an average coefficient of thermal expansion less than $25 \times 10^{-7}/°$ C. over the range from 0 to 300° C. and no more than 60% of the expansion coefficient of said glass before said in situ crystallization. It is believed that the glass-ceramic materials or structures, made by thermal in situ crystallization of crystallizable glasses embraced by the above formulations, contain as predominant crystalline species lithium-containing crystalline phases, either as beta-eucryptite or beta-eucryptite-like crystals or as beta-spodumene or beta-spodumene-like crystals, or both, and that these lithium-containing crystalline phases are present in greater amount by volume than any other crystalline material which is present in the shaped glass-ceramic structure, e.g., cookware.

THE OVERALL PROCESS

The following description is given with particular reference to FIG. 3, which is a process flow sheet in the form of a block diagram, and wherein the processing conditions that will be described are intended to be illustrative only. The processing details, as hereafter given, are particularly applicable when using crystallizable glass compositions of the kind set forth in the aforementioned copending applications of Smith and of Babcock et al.

The melting and refining techniques are conventional, being modified only to the extent necessary for the particular crystallizable glass composition employed. Likewise, the glass-conditioning and gob-feeding techniques are conventional, only such modifications being made as are required for the particular glass composition used. The optical-temperature range of a gob of a typical haze-forming crystallizable glass composition is, for example, usually within the range of about 2540°–2750° F., more particularly about 2540°–2675° F., the average being about 2585° F. The gob is fed to the mold (third block diagram of FIG. 3), and in FIGS. 1 and 2 the glass gob 22 is shown in the female member 24 (FIG. 1) of the mold.

At station 14 (FIGS. 1 and 2), the glass gob is pressed to form a shaped structure, e.g., cookware. The total pressing force is, for example, from 5500 pounds up to 11,000 pounds depending upon the glass composition used, size and shape of the article being formed, and other influencing factors.

The temperature of molding cannot be determined with exactness, but it is obviously below the temperature of the gob when deposited in the female member of the mold at station 12 (FIGS. 1 and 2).

At station 16 (FIGS. 1 and 2) the inner surfaces and preferably also the top edge of the shaped article are heat-glazed in the mold, as indicated in the fifth block diagram of FIG. 3. At this station heat is applied from an external source to the hot pressed ware to effect the results previously described. The heat, e.g., from a combustion flame, is of sufficient intensity to soften uniformly the inside surface of the shaped structure in a short interval of time, e.g., from 0.2 to 3 seconds. Preferably external burner(s) with their emanating flames are swept across the inner surfaces (and preferably also the top edge) of the molded article, as opposed to static positions for the said burner(s), thereby avoiding localized heating or distortion due to the flame pattern(s) of the burner(s). Preferably, also, a coolant tube (not shown in the drawing) through which a cooling fluid circulates is suitably arranged above the top of the pressed ware during the flame treatment.

The temperature of the shaped article immediately after the heat-glazing step closely approaches its initial flow point; for example, a temperature (at least on the surface) approaching that of the temperature of the flame used in heat-glazing. This flame temperature may be, for instance, within the range of 2500°–3300° F., e.g., about 3000° F. Such a flame temperature may be obtained by, for example, the combustion of a mixture of natural gas and oxygen; or, for certain temperatures within this range, by the combustion of a mixture of natural gas, air and oxygen.

At station 18 (FIG. 2) the hot, heat-glazed article is subjected to a blast of a gaseous coolant, e.g., air, in order to reduce its temperature sufficiently low for removal from the mold at station 20 with a suction-cup, mechanical, take-out device.

At take-out the temperature of the shaped article, e.g., cookware, at its center face usually ranges from about 750° to 960° F., the average being about 820° F. One station after take-out the mold temperature at its center face generally ranges from about 700° to 1040° F., the average being about 900° F.; the temperature of the sidewalls of the mold, midway up, usually ranges between 780° F. as a minimum and 1040° F. as a maximum; and the temperature of the mold at its top varies from about 680° to 980° F.

After removal of the shaped structure from the mold it is conveyed to a fire-polishing station where the article is flame-treated to remove the mold ridges.

The fire polishing may be accomplished in several different ways. One method involves the use of a Knight fire polisher whereby ware is transported in line through or past a series of stationary burners, the ware being rotated about its central axis (in a horizontal plane) as it is carried along on a chain. Fire polishing also may be effected by the use of downwardly projecting burners that are placed in an oscillatory motion in a horizontal plane. By still another method of fire polishing the ware is rotated (but not transported) and heated by cam-operated moving burners.

The temperature of the ware at the end of the conveyor after it has been fire-polished to remove mold ridges usually is about 840° F. ±60° F. At this same point, the temperature of the ware when the fire-polishing step has been omitted is about 100° F. less, that is, about 740° F.±60° F.

The processing operations are completed by annealing the ware, after which it is "nucleated and crystallized" (i.e., partly crystallized in situ with the aid of nucleating agents) by controlled heat treatment, whereby the desired glass-ceramic body is obtained. The cooled glass-ceramic article may be marketed as such; or, optionally, before or after cooling it may be decorated in any suitable manner with any desired design, insignia, word(s), numeral(s), etc.

The annealing-point temperature will vary with the particular crystallizable glass composition employed. This temperature can be determined, for example, in accordance with ASTM Designation C336–54T, the testing apparatus being calibrated using fibers of standard glasses having known annealing and strain points as specified and published by the National Bureau of Standards.

Any suitable temperature conditions may be employed to effect the degree and type of nucleation and crystallization of the crystallizable glass compositions used in making the shaped glass structures. When the preferred glass compositions disclosed in the aforementioned copending applications of Smith and of Babcock et al. are employed, generally the annealed ware is heated first at a low temperature to form many nuclei or crystallites, and thereafter at a higher temperature to complete crystallization to the desired degree. The optimum heat-treatment depends, for instance, upon the particular glass composition, the ratios of its ingredients, the type and amount of its nucleants, as well as upon the properties desired in the final product. Therefore, it is not possible to specify a heat-treating schedule that will be common to all useful crystallizable glasses. However, it is ordinarily preferred that the aforementioned low-temperature heat-treatment be in the region of maximum or high rate of nuclei or crystallite formation, wherein "nuclei" are defined as submicroscopic precursors of crystalline species or as a finely dispersed submicroscopic immiscible glassy phase. The optimum temperature of this initial heat treatment seems to lie in the range from the annealing point of the glass to about 250° F. above its annealing point.

The following schedule for effecting nucleation and crystallization is typical when a crystallizable glass is used having the following approximate composition: 70.7% $SiO_2$, 16.8% $Al_2O_3$, 3.4% $Li_2O$, 1.8% $TiO_2$, 1.3% $ZrO_2$, 3.9% MgO, 1.4% $P_2O_5$, 0.5% $Na_2O$, 0.1% $As_2O_3$, and 0.09% F. The shaped or formed glass, which is made from a haze-forming composition, is cooled to below its annealing-point temperature of about 1200° F. and is thereafter heat-treated as follows.

| Temperature, °F.: | Hours |
|---|---|
| 1260 | 2 |
| 1320 | 1 |
| 1370 | 1 |
| 1420 | 1 |
| 1470 | 1 |
| 1580 | 1 |

The glass body is then rapidly cooled at the rate of about 400° F. per hour. The lineal coefficient of thermal expansion of the resulting glass-ceramic article over the range of 0°–300° C. is about $9 \times 10^{-7}/°C$.

The method of the instant invention is useful in the production of glass-ceramic bodies or structures in general, but is most useful in manufacturing glass-ceramic bodies from thermally crystallizable glasses that normally contain haze-forming ingredients or matter. The haze-forming substance may be derived from, for example, the nucleating agent or agents employed (or from an aid to nucleation) such as, for instance, a phosphorus-containing compound (e.g., aluminum metaphosphate) in which the phosphorus is either present or is calculated to be present as $P_2O_5$. Or, the haze-forming substance(s) may be due to certain lower or higher amounts of certain of the components of the glass composition, e.g., zirconia or lithia. Thus, in crystallizable glass compositions of the kind used in practicing this invention, increasing the amount of lithia from slightly below 2.5% to about 3.1%, while holding the amount of zirconia and $P_2O_5$ constant at about 1.4% and 0.5%, respectively, give a haze-forming crystallizable glass composition. Also, holding the percentages of zirconia and lithia constant as just described and increasing the amount of $P_2O_5$ from 0.5% to 1.5% yields a haze-forming crystallizable glass composition. Another example is a glass composition of the kind herein involved in which zirconia is 1.6%, lithia is 3.5% and $P_2O_5$ is 1.5%. Another example of a haze-forming glass composition is one wherein zirconia is 1.6%, lithia is 3.4% and $P_2O_5$ is 2.05%. Still another example of such a composition is one wherein zirconia is 1.5%, lithia is 3.4% and $P_2O_5$ is 2.15%.

From the foregoing description and the accompanying drawing it will be apparent to those skilled in the art that, in practicing this invention, the inner surface of the shaped structure, e.g., cookware, is softened with a reduced amount of external heat at the time in the process cycle when the ware is hottest; furthermore, distortion is minimized because the ware is still confined in the mold.

Thus the invention is applicable to glass-ceramics made by thermal in situ crystallization of a crystallizable glass containing as essential components lithia, alumina and silica, together with sufficient nucleating agent to promote crystallization, thereby to yield a ceramic having an average lineal coefficient of thermal expansion, over the range from 0–300° C., less than $25 \times 10^{-7}/°C.$, more particularly less than $20 \times 10^{-7}/°C.$, and having, as predominant in situ-formed crystalline species, lithium-containing crystals in the form of beta-eucryptite or beta-eucryptite-like crystals, or beta-spodumene or beta-spodumene-like crystals or both, said ceramics containing a multitude of such crystalline species in random orientation throughout said ceramic and dispersed in a glassy matrix remaining as a result of the in situ crystallization, and substantially all the crystals of said ceramic having a diameter of less than 25 microns.

In the compositions embraced by the foregoing description, a number of nucleating agents can be employed. For instance, $TiO_2$, $ZrO_2$, $SnO_2$, and $P_2O_5$ can be used alone or in combination with each other, where the total amount of one or more of such nucleating agents employed is between 2 and 10 weight percent of the total glass composition. Also, $Cr_2O_3$ can be used as a nucleating agent in amounts of about 0.2 weight percent or less, together with about 1–10 weight percent of any of the nucleating agents previously mentioned.

A particularly useful range of glasses and glass-ceramics within the scope of the foregoing description, and to which the present invention is applicable, are those containing 50–75 weight percent $SiO_2$, 16–35 weight percent $Al_2O_3$ and from 2.5–6 weight percent $Li_2O$, based on the total glass composition, as well as the amount of nucleating agent found to be necessary to promote the formation of the small crystals.

The terms beta-eucryptite crystals and beta-eucryptite-like crystals are herein used alternatively and in a generic sense. Thus, while beta-eucryptite is often thought of as the species crystal having one mole of lithium, one mole of aluminum and two moles of silicon, both terms are used in this application to designate crystalline species having the beta-eucryptite structure, as shown by X-ray diffraction, but the peaks can be shifted slightly depending upon whether there is a definite amount of silica present other than exactly two moles, either more or less silica than the two moles. Similarly, the terms beta-spodumene crystals and beta-spodumene-like crystals are herein used alternatively and in a generic sense, specifying crystalline species that have the crystalline structure of beta-spodumene that contains four moles of silica to one of alumina and one of lithia, but with the peaks shifted somewhat when the crystalline structure contains more or less than four moles of silica. Thus, as employed herein, the terms beta-eucryptite and beta-spodumene are each used in this generic sense.

Apparatus especially adapted to be used in carrying out the heat-glazing feature of the instant invention is disclosed and claimed in U.S. Pat. No. 3,395,008, and assigned to the same assignee as the present invention.

As will be evident to those skilled in the art, modifications of this invention can be made or followed in the light of the foregoing disclosure without departing from the spirit and scope of the disclosure or from the scope of the claims.

I claim:
1. The method which comprises:
(A) depositing a gob of hot thermally crystallizable glass composition in a female mold;
(B) pressing said hot gob to shape of a mold adapted to form a hot shaped article having bottom and sidewall inner surfaces and a top edge, which surfaces and edge also are hot;
(C) subjecting the said hot bottom and sidewall inner surfaces and top edge of the shaped article, while still in the said mold, to a flame treatment for a brief period of time, the flame treatment being sufficient to initiate uniform softening of the crystallizable glass but insufficient to initiate nucleation thereof;
(D) removing the shaped flame-treated article from the mold;
(E) fire-polishing the shaped flame-treated article after removal from the mold to remove sharp edges created by the molding operation;
(F) annealing the fire-polished article; and
(G) effecting nucleation and at least partial crystallization of the annealed article thereby to form a shaped glass-ceramic article, whereby haziness of the bottom and sidewall inner surfaces and top edge of the annealed article is eliminated.

2. The method as in claim 1 wherein the flame treatment in Step C is for a period of time within the range of from 0.2 to 3 seconds.

3. The method described in claim 1 wherein the directly applied flame is swept across the inner surfaces of the hot, shaped articles at a flame temperature of about 2500° F. to 3300° F. for about 0.2 to 3 seconds.

4. The method described in claim 1 wherein the crystallizable glass composition has a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent of $$Li_2O+MgO$$

is up to 10.5.

5. The method described in claim 4 wherein the $P_2O_5$ content of the crystallizable glass composition is a small amount not exceeding 3 weight percent of $P_2O_5$.

6. The method described in claim 5 wherein the $P_2O_5$ content is from about 0.5 weight percent to 3 weight percent of $P_2O_5$.

References Cited
UNITED STATES PATENTS

| | | | |
|---|---|---|---|
| 959,500 | 5/1910 | Fry | 65—120 |
| 960,587 | 6/1910 | Sanford | 65—120 |
| 3,022,180 | 2/1962 | Morrissey et al. | 65—33 XR |
| 3,282,711 | 11/1966 | Lin | 65—33 XR |
| 3,282,712 | 11/1966 | Kyoto et al. | 65—33 XR |
| 3,282,770 | 11/1966 | Stookey et al. | 65—33 XR |
| 3,313,609 | 4/1967 | Megles | 65—33 XR |
| 3,309,190 | 3/1967 | Belentepe et al. | 65—306 XR |

FOREIGN PATENTS 944,571    12/1963    Great Britain.

FRANK W. MIGA, Primary Examiner

U.S. Cl. X.R.

65—30, 69, 104, 120